US008308476B2

(12) United States Patent
Tabassi et al.

(10) Patent No.: US 8,308,476 B2
(45) Date of Patent: Nov. 13, 2012

(54) INJECTION MOLDING APPARATUS HAVING A MAGNETIC VALVE PIN COUPLING

(75) Inventors: Payman Tabassi, Rockwood (CA); Denis Babin, Georgetown (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 75 days.

(21) Appl. No.: 13/038,347

(22) Filed: Mar. 1, 2011

(65) Prior Publication Data

US 2012/0225148 A1 Sep. 6, 2012

(51) Int. Cl.
B29C 45/23 (2006.01)

(52) U.S. Cl. ............... 425/564; 264/328.9; 425/572

(58) Field of Classification Search ............. 425/562, 425/564, 572; 264/328.9
See application file for complete search history.

(56) References Cited

U.S. PATENT DOCUMENTS

| | | | |
|---|---|---|---|
| 3,887,312 A | 6/1975 | Seary | |
| 5,334,010 A | 8/1994 | Teng | |
| 5,948,448 A | 9/1999 | Schmidt | |
| 6,276,916 B1 | 8/2001 | Schad et al. | |
| 6,309,208 B1 | 10/2001 | Kazmer et al. | |
| 6,514,440 B1 | 2/2003 | Kazmer et al. | |
| 6,638,049 B1 | 10/2003 | Moss et al. | |
| 6,659,757 B2 | 12/2003 | Kim et al. | |
| 7,121,820 B2 | 10/2006 | Tooman et al. | |
| 7,131,834 B2 | 11/2006 | Babin et al. | |
| 7,175,419 B2 | 2/2007 | Babin | |
| 7,210,922 B1 | 5/2007 | Kohler | |
| 7,214,048 B2 | 5/2007 | Kim | |
| 7,270,537 B2 | 9/2007 | Doyle et al. | |
| 7,275,923 B2 | 10/2007 | Tooman et al. | |
| 7,316,553 B2 | 1/2008 | Teng et al. | |
| 7,341,445 B2 | 3/2008 | Paris et al. | |
| 7,553,150 B2 | 6/2009 | Kaushal et al. | |
| 7,569,169 B2 | 8/2009 | Vasapoli et al. | |
| 7,722,351 B2 * | 5/2010 | Feick et al. ................. 425/564 |
| 7,931,455 B2 * | 4/2011 | Tabassi ........................... 425/3 |
| 7,963,762 B2 * | 6/2011 | Tabassi et al. ............. 425/562 |
| 7,988,445 B2 * | 8/2011 | Tabassi et al. ............. 425/564 |
| 8,100,689 B2 | 1/2012 | Bouti et al. | |

(Continued)

FOREIGN PATENT DOCUMENTS

CA 2366321 7/2001

(Continued)

OTHER PUBLICATIONS

Baumann, Martin et al., "Electrically Actuated Valve Gates: An Emerging Hot Runner Technology", *MoldMaking Technology*, (Aug. 2008),31-34.

(Continued)

*Primary Examiner* — Tim Heitbrink
(74) *Attorney, Agent, or Firm* — Medler Ferro PLLC (57) ABSTRACT

An injection molding apparatus is disclosed having an actuated part that is movable in forward and rearward directions with a magnetic valve pin coupling attached thereto. A valve pin for opening and closing a mold gate is coupled to the magnetic valve pin coupling to be movable with the actuated part. When the actuated part is moved in an opening stroke direction and the valve pin experiences a stopping force, the magnetic valve pin coupling permits the valve pin to become decoupled from the actuated part to prevent continued movement of the valve pin with the actuated part.

24 Claims, 9 Drawing Sheets

U.S. PATENT DOCUMENTS

| | | | |
|---|---|---|---|
| 8,142,182 B2 * | 3/2012 | Feick et al. | 425/549 |
| 2005/0048162 A1 | 3/2005 | Teng et al. | |
| 2006/0222731 A1 | 10/2006 | Paris et al. | |
| 2009/0102099 A1 | 4/2009 | Feick et al. | |
| 2011/0018172 A1 | 1/2011 | Bouti et al. | |

FOREIGN PATENT DOCUMENTS

| | | |
|---|---|---|
| CA | 2 757 408 | 10/2010 |
| DE | 19608676 C1 | 1/1997 |
| DE | 19611880 | 10/1997 |
| JP | 197924 | 6/1989 |
| JP | 2000-061995 | 2/2000 |
| JP | 2001-193596 | 7/2001 |
| JP | 3150283 U | 5/2009 |
| KP | 10-0514235 | 9/2005 |
| KR | 10-2005-0044053 A | 5/2005 |
| KR | 100655750 | 12/2006 |
| WO | 2005/046953 A2 | 5/2005 |
| WO | WO-2006/080807 | 8/2006 |
| WO | WO-2008/055339 | 5/2008 |
| WO | WO-2009/120534 | 10/2009 |
| WO | WO-2010/015074 | 2/2010 |

OTHER PUBLICATIONS

Gray, Stephen et al., "Plate Actuated Hot Runner Valve Gates for Improved Part Quality and Molding Process Consistency", *ANTEC*, (2009),2991-2995.

"European Search Report", EP Appl. No. 11 00 4210.8, mailed Nov. 8, 2011.

"Supplementary European Search Report", EP Appl. No. 08 84 2173.0, mailed Dec. 5, 2011.

International Search Report and Written Opinion, Int'l Appl. No. PCT/CA2012/000189, May 18, 2012.

* cited by examiner

INJECTION MOLDING APPARATUS HAVING A MAGNETIC VALVE PIN COUPLING

FIELD OF THE INVENTION

The present invention relates to injection molding, and more particularly, to an injection molding apparatus having a valve pin.

BACKGROUND OF THE INVENTION

Injection molding apparatuses, such as hot halves and hot runners, commonly use valve pins to control flow of molding material. Improper valve pin operation can cause damage to the valve pin or to surrounding components, such as a nozzle tip, a nozzle tip liner, a nozzle tip guide sleeve, and/or a mold gate such that it is desirable in certain applications to take a valve pin out of service. In addition, it is sometimes desired to take a valve pin out of service when a mold cavity, a valve pin, a heater, a mold gate, or other related component wears or fails. Replacement of a damaged valve pin or manual disengagement of a valve pin can be time consuming and costly.

Magnetic valve pin couplings have been proposed that permit decoupling of a valve pin from its respective actuator or a common valve pin plate upon experiencing a stopping force. During use of such magnetic valve pin couplings there is contact between a magnet attached to the actuator or valve pin plate and a magnetizable valve pin holder for holding the valve pin. Magnets for use in magnetic valve pin couplings are selected by the pulling force of the magnet, which is the force it takes to pull the magnet free from the valve pin holder or put another way the limit of the holding force of the magnet. The required pulling force of a magnet for a particular injection molding application however is often hard to predict as it depends on the molding application and various factors, for instance one or more of: the properties of the plastic material, such as Durometer hardness, viscosity, and shrink factor; the processing conditions, such as processing temperature, mold temperature, injection speed, and injection pressure; the nozzle design, such as nozzle length, runner diameter, and heat profile of nozzle; the gating style, such as gate seal geometry and material type; the mold design, such as cooling layout and condition; the valve pin, such as its diameter, geometry, and surface roughness; the clearance between the valve pin and its respective valve disk which may vary; and the unknown acceleration of actuation particularly for pneumatic and hydraulic actuations.

Due to space constraints within and temperatures experienced by magnetic valve pin couplings, the selection of affordable magnets of a desirable size and pulling force is limited. If a magnet available for a particular molding application does not have an optimal pulling force, some components of the hot runner system may need to be modified or another type of magnet may need to be purchased and placed into the system to permit the pulling force to be overcome in the particular application so that the magnetic valve pin coupling works as intended. Alternatively, adjustment of a valve pin height for each drop may be performed to have a proper protrusion of the valve pin in the gate area that will result in the pulling force of the magnet being overcome and the magnetic valve pin coupling thereby decoupling as intended. Although these are viable solutions to the limited availability of suitable magnets, there is an ongoing need in the art for a magnetic valve pin coupling that may be used with readily available magnets, and permits simple adjustment of the strength of magnetic attraction between components thereof so that the magnetic valve pin coupling decouples when a stopping force is encountered.

BRIEF SUMMARY OF THE INVENTION

Embodiments hereof are directed to an injection molding apparatus having a magnetic valve pin coupling disposed within an actuated part. A valve pin for opening and closing a mold gate is coupled to the magnetic valve pin coupling to be movable with the actuated part. The magnetic valve pin coupling includes a magnetic component and a valve pin component that are separated by a gap G under normal operating conditions, wherein the magnetic component is repositionable relative to the valve pin component to adjust a width of the gap G.

BRIEF DESCRIPTION OF THE FIGURES

The foregoing and other features and advantages of the invention will be apparent from the following description of embodiments thereof as illustrated in the accompanying figures. The accompanying figures, which are incorporated herein and form a part of the specification, further serve to explain the principles of the invention and to enable a person skilled in the pertinent art to make and use the invention. The figures may not be to scale.

DETAILED DESCRIPTION OF EMBODIMENTS OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Although the description of embodiments hereof is in the context of a hot runner injection molding systems, the invention may also be used in other molding arrangements, such as liquid silicon rubber molding applications. Furthermore, there is no intention to be bound by any expressed or implied theory presented in the preceding technical field, background, brief summary or the following detailed description.

Figure 1:
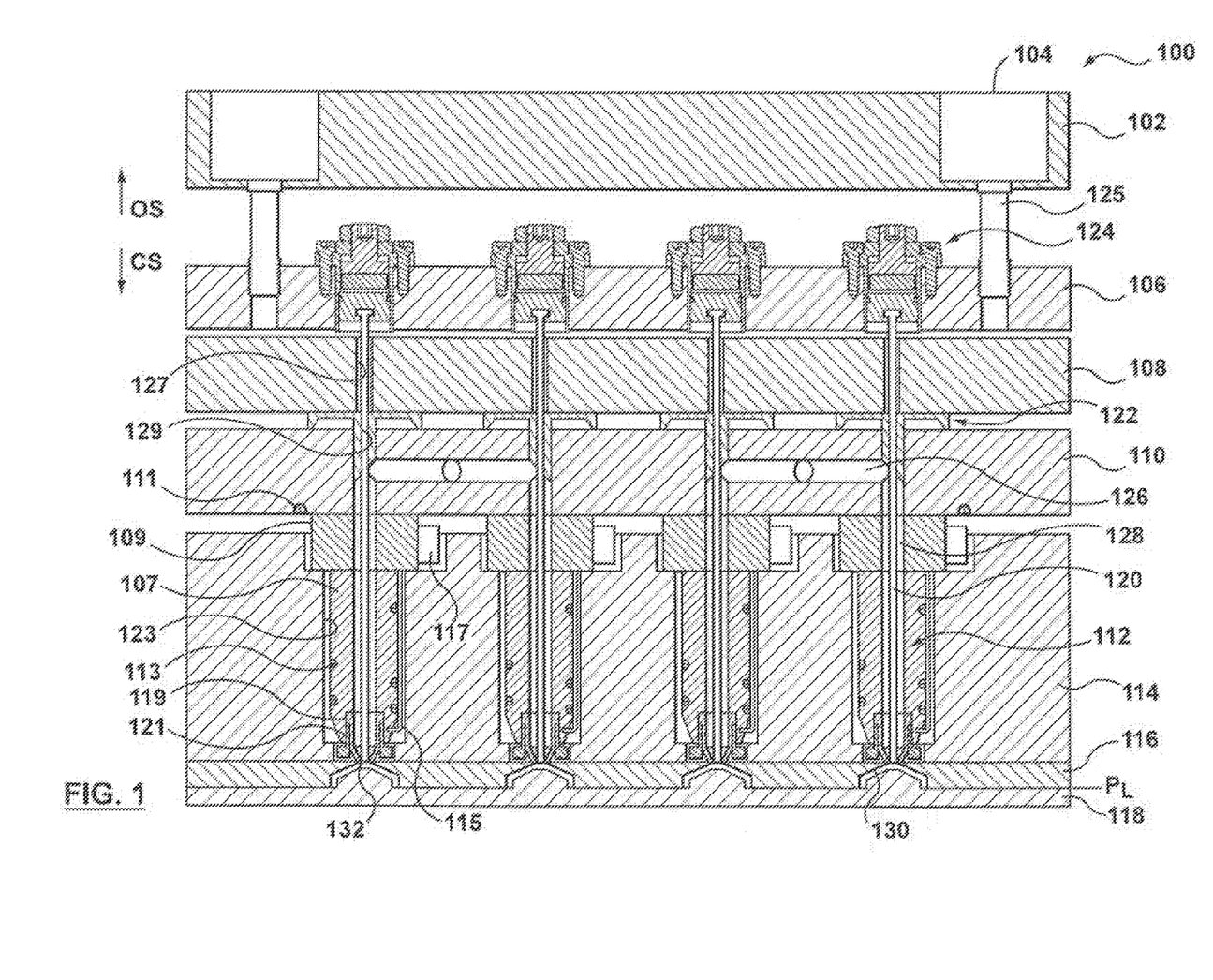
FIG. 1 is a sectional view of an injection molding apparatus according to an embodiment of the present invention.

Embodiments hereof relate to, among other things nozzles and components which can be used in an injection molding apparatus such as injection molding apparatus 100 shown in FIG. 1. The features and aspects described for the other embodiments can be used accordingly with the present embodiment. In the following description, "downstream" is used with reference to the direction of mold material flow from an inlet of the injection molding system to a mold cavity, whereas "upstream" is used with reference to the opposite direction. Similarly, "forward" is used with reference to a direction towards a parting line $P_L$ between a mold cavity plate and a mold core, whereas "rearward" is used with reference to a direction away from the parting line.

Injection molding apparatus 100 includes an actuator plate 102, actuators 104, a valve pin plate 106, which may also be referred to as a yoke plate or synchro plate, magnetic valve pin couplings 124, a back plate 108, valve pin bushings 122, a manifold 110, nozzles 112, a mold plate 114, a cavity plate 116, a core plate 118, and valve pins 120. Injection molding apparatus 100 can include any number of manifolds and nozzles, in any configuration. In this embodiment, one manifold is shown for simplicity. Injection molding apparatus 100 may also include additional components, such as additional mold plates, alignment dowels, mold gate inserts, cooling channels, bolts, lifting holes, among others without departing from the scope hereof.

Actuator plate 102 has openings for accommodating actuators 104. If actuators 104 depend on a working fluid for operation, i.e., pneumatic or hydraulic types, fluid conduits (not shown) can be provided in actuator plate 102. Should actuators 104 be electric or magnetic or of some other design, electrical conduits (not shown) can be provided in actuator plate 102. An actuator support plate (not shown) may be utilized between actuator plate 102 and back plate 108 to accommodate movement of valve pin plate 106 therein.

Actuators 104 translate valve pin plate 106 during an opening stroke OS and a closing stroke CS by linear motion, e.g., a pneumatic piston, or rotary motion, e.g., an electric screw drive. To accomplish such movement, each actuator 104 has a stationary part, e.g., a housing or cylinder, connected to actuator plate 102 and also has a movable part 125, e.g., a piston or part extending from the piston, connected to valve pin plate 106. The number of actuators is a design choice, and in other embodiments more or fewer actuators can be used. Any style of actuator is suitable, provided that it can translate valve pin plate 106 during the opening and closing strokes thereof such that valve pins 120 correspondingly move between an open position where a tip of the valve pin is unseated from mold gate 132 and a closed position where the tip of the valve pin is seated within mold gate 132. In FIG. 1, valve pin plate 106 is positioned such that valve pins 120 are in the closed position with the tips thereof seated within mold gates 132.

Valve pin plate 106 is connected to movable part 125 of each actuator 104. Valve pin plate 106 has a plurality of openings associated with magnetic valve pin couplings 124. Valve pin plate 106 moves in an axial longitudinal direction toward manifold 110, and away from manifold 110 in response to the actuation of the actuators 104. Movement of valve pin plate 106 and associated valve pins 120 toward manifold 110 and mold gates 132 can be described as a closing stroke CS, whereas movement of valve pin plate 106 and associated valve pins 120 away from manifold 110 and mold gates 132 can be described as an opening stroke OS. Valve pin plate 106 need not be a plate as such, but can be any rigid member capable of connecting one or more actuators to a plurality of magnetic valve pin couplings 124. In other embodiments, the valve pin plate 106 is an assembly of stacked plates.

Back plate 108 is disposed between valve pin plate 106 or the actuator support plate (not shown) and valve pin bushings 122 and serves to secure valve pin bushings 122 against manifold 110. Back plate 108 has several bores 127 through which valve pins 120 extend. Each valve pin bushing 122 includes a disc-shaped main body and a cylindrical bushing portion connected to and extending from the main body and into manifold 110. Each valve pin bushing 122 has a valve pin bore 129, which creates a seal with valve pin 120 while still allowing valve pin 120 to slide in an axial direction.

Manifold 110 defines a manifold melt channel 126 (partially shown) and includes a manifold heater 111. Manifold melt channel 126 receives a melt stream of moldable material, e.g., plastic melt, from an inlet component (not shown) or an upstream manifold (not shown). Manifold heater 111 can be of any design, such as the insulated resistance wire illustrated. Due to the plate interconnections (not shown), manifold 110 is stationary in the actuation direction, which means it is fixed in a longitudinal direction, relative to the stationary parts of actuators 104.

Upstream ends or nozzle flanges 109 of nozzles 112 are abutted against manifold 110 and each nozzle 112 defines one of a plurality of nozzle melt channels 128 in fluid communication with manifold melt channel 126 for delivering a melt stream of moldable material to mold cavities 130 via mold gates 132. In the embodiment shown in FIG. 1, each nozzle 112 includes a nozzle body 107, nozzle flange 109, a nozzle heater 113 embedded in nozzle body 107, a thermocouple 115, a terminal end 117 for connecting the heater to a power source (not shown), a nozzle tip 119 and a tip retainer 121. In an embodiment, nozzle tip 119 is of a thermally conductive material and tip retainer 121 is of a less thermally conductive material than nozzle tip 119. Nozzles 112 in combination with manifold 110 may be referred to as a hot runner system.

Mold plate 114 has wells or openings 123 to accommodate and support nozzles 112. Wells 123 are sized to provide an insulative air space between nozzles 112 and mold plate 114. Cavity plate 116 and core plate 118 define mold cavities 130, and cavity plate 116 defines mold gates 132 leading into mold cavities 130. Cavity plate 116 and core plate 118 are separable along a parting line $P_L$ to allow ejection of molded products from mold cavities 130. In other embodiments, a single cavity can be fed molding material by one or more nozzles 112. It would be understood by one of skill in the art that other mold cavity and gate arrangements may be utilized with embodiments hereof without departing from the scope hereof.

Each valve pin 120 extends from its respective magnetic valve pin coupling 124 to mold gate 132 through back plate 108, valve pin bushing 122 and nozzle melt channel 128 for controlling the flow of molding material through the respective mold gate 132 and into the respective mold cavity 130 when actuated between an open and closed position. In the gating style depicted, a forward or closing stroke movement of valve pin 120 seats at least a tip of valve pin 120 within mold gate 132 thereby closing mold gate 132 to prevent the flow of moldable material into mold cavity 130, whereas a rearward or opening stroke movement of valve pin 120 unseats the valve pin tip from mold gate 132 thereby opening mold gate 132 to allow the flow of moldable material to enter mold cavity 130. In an alternate embodiment, the directions associated with opening and closing the valve gates are reversed such that forward or opening stroke movement of the valve pins opens the mold gates and the rearward or closing stroke movement of the valve pins closes the mold gates. As discussed in greater detail herein, regardless of the direction of actuation used to open and close mold gates 132, when one or more valve pins 120 encounters a stopping force greater than a predetermined threshold whereby damage may occur to mold gate 132, valve pin 120 or any other associated component, the associated magnetic valve pin coupling 124 compensates by stopping the movement of the affected valve pin(s) 120, which in turn mitigates potential damage while still allowing the remaining valve pin(s) 120 not experiencing a stopping force beyond the predetermined threshold to continue to move in response to actuation of valve pin plate 106 by actuators 104.

Figure 2:
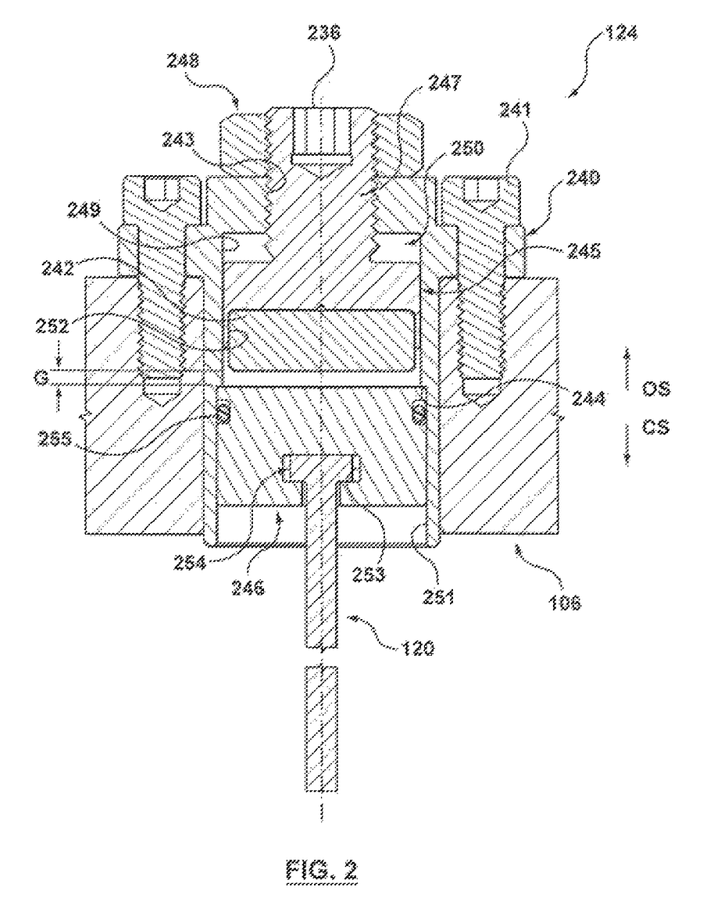
FIG. 2 is a sectional view of a magnetic valve pin coupling of the apparatus of FIG. 1 under normal operating conditions shown disposed within a portion of a valve pin plate with all other parts removed for clarity.

Each magnetic valve pin coupling 124 couples a respective valve pin 120 to valve pin plate 106. FIG. 2 illustrates an enlarged sectional view of magnetic valve pin coupling 124 shown in a portion of injection molding apparatus 100 of FIG. 1 with valve pin 120 shown under normal operating conditions. A main housing 240 of magnetic valve pin coupling 124 is attached to valve pin plate 106 by machine bolts 241. Main housing 240 includes a stepped bore 250 therethrough with an internally-extended shoulder 244 separating a first bore segment 251 from a second bore segment 249, wherein a diameter or width of first bore segment 251 is larger than a diameter or width of second bore segment 249. A valve pin holder 246, which is described in more detail below, is sized to be slidably received within first bore segment 251 of housing 240 and to contact shoulder 244 during normal operating conditions. When the valve pins are being closed, that is moved towards mold gates 132 in the closing stroke direction "CS," main housing 240 transfers a closing force of valve pin plate 106 to valve pin 120 via the contact between housing shoulder 244 and valve pin holder 246.

A magnet holder 245 is sized to be slidably received and longitudinally repositionable within second bore segment 249 of main housing 240 and includes a threaded projection 247 that is threadably received within a threaded third bore segment or opening 243 of main housing stepped bore 250. Threaded projection 247 includes a threaded tool bore 236 for receiving a threaded tool (not shown) that may be used to rotate magnet holder 245 relative to main housing 240. Magnet holder 245 holds a magnet 242 in a bore 252 within an end surface thereof. Although magnet 242 is shown only partially seated within bore 252 such that a portion of magnet 242 extends out of bore 252, in another embodiment magnet 242 may be fully seated within bore 252. In an embodiment, magnet holder 245 is made of magnetically responsive material and as such is connected to magnet 242 by an attractive magnetic force. In another embodiment, magnet 242 is held within magnet holder 245 by a suitable adhesive. In still another embodiment, magnet holder 245 is made of magnetically responsive material and is connected to magnet 242 by an attractive magnetic force as well as an adhesive. A magnetically responsive material can be ferromagnetic, ferrous material, or any other kind of material that experiences a significant force in the presence of a magnetic field. Magnet 242 can be a permanent magnet, for example, a neodymium magnet or a samarium-cobalt magnet, an electromagnet, or a combination of such, provided that an attractive magnetic force exists between magnet 242 and valve pin holder 246, as described herein.

Valve pin 120 is coupled to valve pin holder 246 by way of a slot 253 into which a head portion 254 of valve pin 120 is inserted. An O-ring 255 is disposed within a circumferential groove of valve pin holder 246. O-ring 255 contacts first bore segment 251 of housing 240 in which valve pin holder 246 is slidably located and serves to prevent dust or other debris from entering a gap "G" that is maintained between magnet 242 and valve pin holder 246, as described herein. Valve pin holder 246 is made of magnetically responsive material, e.g., ferromagnetic material, and under normal operating conditions is held against housing shoulder 244 by the magnetic attraction or attractive force of magnet 242.

As previously noted when positioned within housing 240 under normal operating conditions, magnet 242 and valve pin holder 246 are separated by gap "G" that allows the magnetic attraction or attractive force provided by magnet 242 on valve pin holder 246 to be adjusted. More particularly the threaded connection between threaded opening 243 of main housing 240 and threaded projection 247 of magnet holder 245 allows magnet holder 245 to be longitudinally repositioned relative to main housing 240 and valve pin holder 246 by clockwise or counterclockwise rotation of magnet holder 245 relative to main housing 240. For instance, a clockwise rotation of magnet holder 245 relative to main housing 240 will open or increase a width of the gap G between magnet 242 and valve pin holder 246 and thereby decrease the attractive force of magnet 242 acting on valve pin holder 246. Conversely, a counterclockwise rotation of magnet holder 245 relative to main housing 240 will slightly close or decrease the width of the gap G between magnet 242 and valve pin holder 246 and thereby increase the attractive force of magnet 242 acting on valve pin holder 246. Although a clockwise rotation is described to open gap G and counterclockwise rotation is described to close gap G, the reverse could be true without departing from the scope hereof. In either case, the width of gap G is set such that the attractive force or magnetic attraction of magnet 242 acting on valve pin holder 246 is sufficient under normal operating conditions to transfer an opening force of valve pin plate 106 to valve pin 120 and is overcome when valve pin 120 encounters a stopping or pulling force over a predetermined attractive force value. Once a longitudinal position of magnet 242 relative to valve pin holder 246 that achieves a desired attractive force is established, a locking nut 248 may be threaded onto the portion of magnet holder threaded projection 247 that extends beyond housing 240 and tightened against housing 240 to thereby set the longitudinal position and desired width of gap G.

During an injection cycle of injection molding system 100, when valve pin plate 106 is actuated in the opening stroke direction OS, the attractive force or magnetic attraction between magnet 242 and valve pin holder 246 of each magnetic valve pin coupling 124 transfers the rearward opening force of valve pin plate 106 to its valve pin holder 246 thereby simultaneously actuating the associated valve pin 120 to unseat from its respective mold gate 132. Conversely, when valve pin plate 106 is actuated in the closing direction CS, contact between main housing 240 and valve pin holder 246 of each magnetic valve pin coupling 124 transfers the forward closing force of valve pin plate 106 to its valve pin 120 thereby simultaneously actuating the associated valve pin 120 to seat within or close its respective mold gate 132.

Figure 2A:
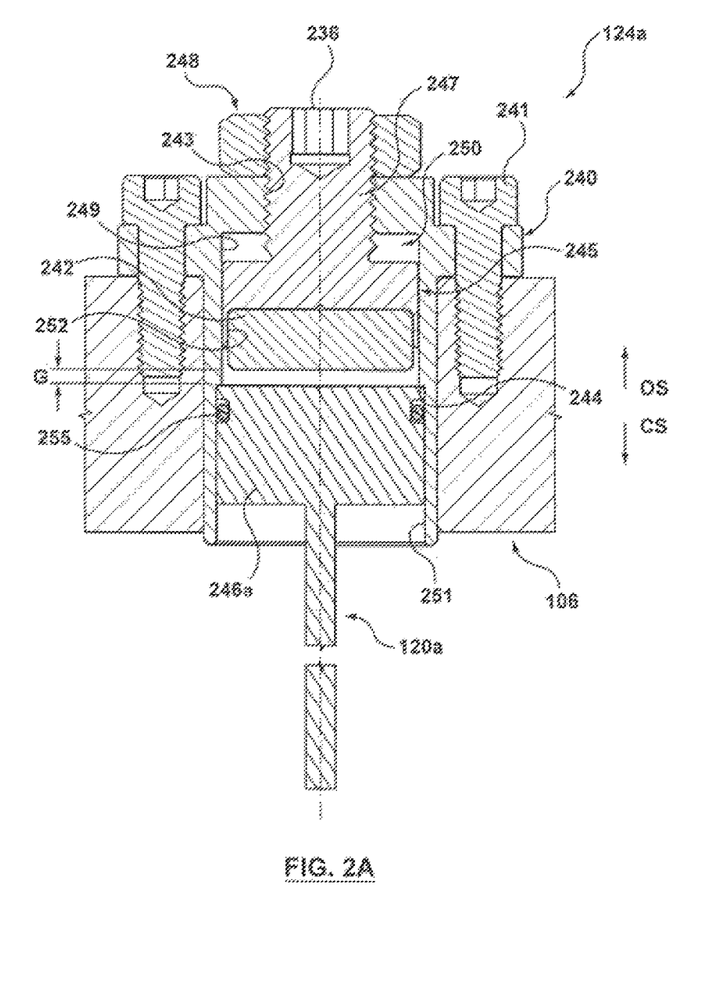
FIG. 2A is a sectional view of a magnetic valve pin coupling of the apparatus of FIG. 1 under normal operating conditions shown disposed within a portion of a valve pin plate in accordance with another embodiment hereof.

FIG. 2A is a sectional view of a magnetic valve pin coupling 124a affixed to valve pin plate 106 in accordance with another embodiment hereof that may be used in the injection molding apparatus 100 of FIG. 1. Features and aspects described with reference to the other embodiments hereof can also be used with the present embodiment. Magnetic valve pin coupling 124a is similar to magnetic valve pin coupling 124 described with reference to FIGS. 1-4 except for valve pin component 246a. Valve pin component 246a is a head portion of valve pin 120a and is formed as a unitary or integrated component therewith. All other features and functions of the embodiment of FIG. 2A are the same as the embodiment of FIGS. 1-4.

Figure 3:
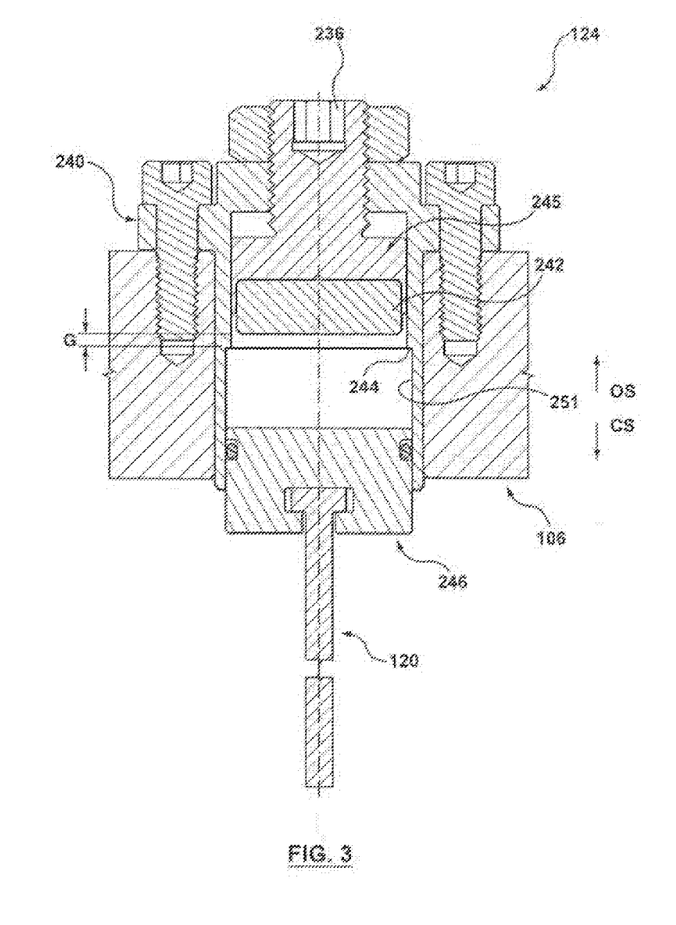
FIG. 3 is a sectional view of the magnetic valve pin coupling of FIG. 2 when a valve pin thereof encounters a stopping force.

FIG. 3 is a sectional view of magnetic coupling 124 of FIG. 2 when valve pin 120 encounters a stopping or immobilizing force during an injection cycle. A non-limiting example of operating conditions that may create a stopping force that acts upon valve pin 120 is solidified molding material in the nozzle channel (not shown). When valve pin 120 experiences a stopping force while valve pin plate 106 is actuated in the opening stroke direction OS that meets or exceeds the attractive force or force of magnetic attraction between magnet 242 and valve pin holder 246, valve pin holder 246 decouples from magnet 242 to slide within housing first bore segment 251 as housing 240 is carried in the opening stroke direction OS with valve pin plate 106. By "decouple" it is meant that valve pin housing 246 moves away from or out of the attractive influence of the magnetic field of magnet 242. The decoupling between magnet 242 and valve pin holder 246 thereby frees valve pin 120 experiencing the stopping force from movement with valve pin plate 106 such that the affected valve pin 120 remains stationary while valve pin plate 106 and the remainder of the unaffected valve pins connected thereto continue to move in the opening stroke direction OS.

The magnitude of the stopping force that will decouple valve pin holder 246 and thus the affected valve pin 120 from valve pin plate 106 may be manipulated by the material selection for magnet 242 and surrounding components and/or the geometry thereof as well as the sizing of gap G between magnet 242 and valve pin holder 246, as discussed above. These variables may be selected to establish a threshold attractive force value that the stopping or pulling force must exceed before decoupling of valve pin holder 246 and magnet 242 occurs.

Figure 4:
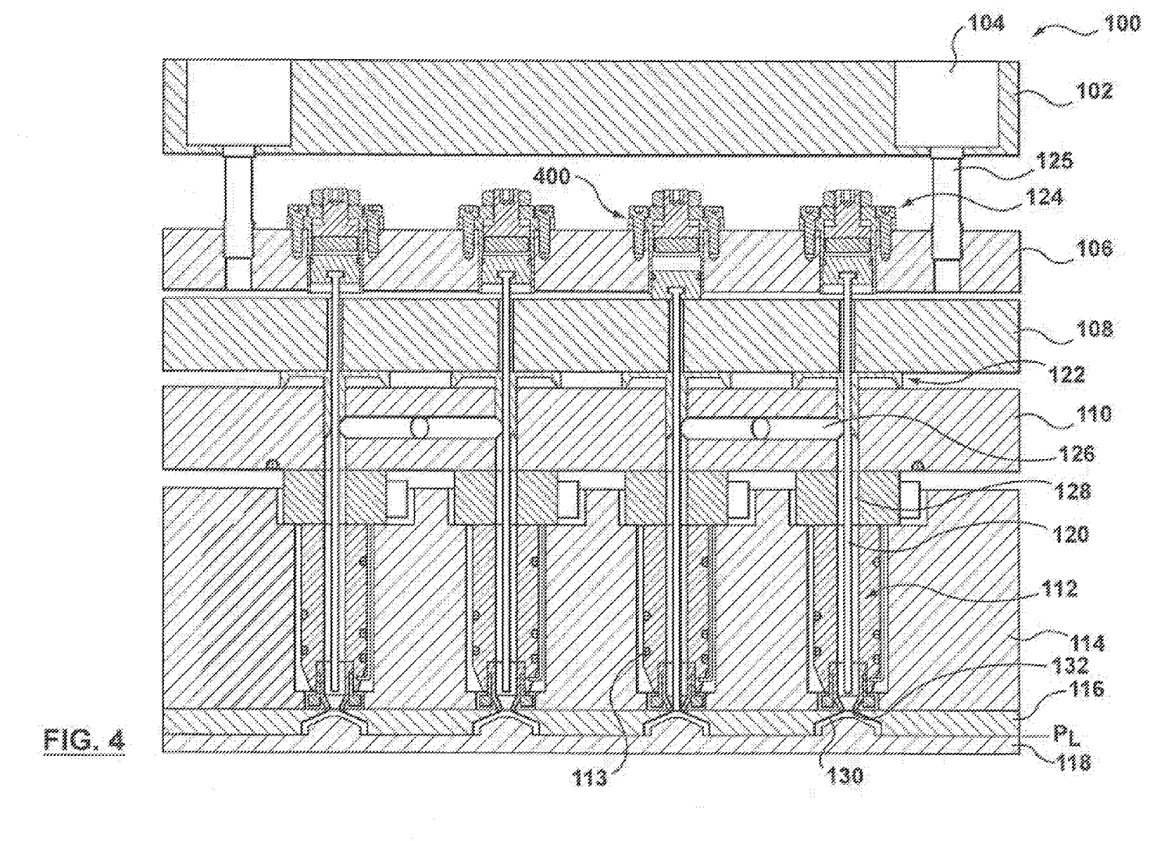
FIG. 4 is a sectional view of the injection molding apparatus of FIG. 1 with one of the valve pins experiencing a stopping force as shown in FIG. 3.

FIG. 4 is a sectional view of the injection molding apparatus of FIG. 1 with valve pin 120 at a position 400 being held in the closed position by a stopping force as described with reference to FIG. 3. Three of valve pins 120 are unseated from their respective mold gates 132 as having been actuated by valve pin plate 106 via their respective magnetic valve pin couplings 124 during the opening stroke, whereas valve pin 120 at position 400 remains seated within its mold gate 132 despite the pull of valve pin plate 106. As shown, magnetic valve pin coupling 124 connected to the deactivated valve pin 120 has reacted to the stopping force with valve pin holder 246 having been longitudinally displaced from housing shoulder 244 by sliding within first bore segment 251 of housing 240 to compensate for the movement of valve pin plate 106. In an embodiment, the stopping force is provided by solidified molding material resulting from respective nozzle heater 113 being shut down. For instance, if an operator desires to take a nozzle 112 out of service because of a worn valve pin or leaking cavity, for example, the respective nozzle heater 113 may be shut down to stop molding material from flowing. In another embodiment, solidified molding material causing a stopping force on valve pin 120 may occur if a nozzle heater fails on its own.

Figure 5:
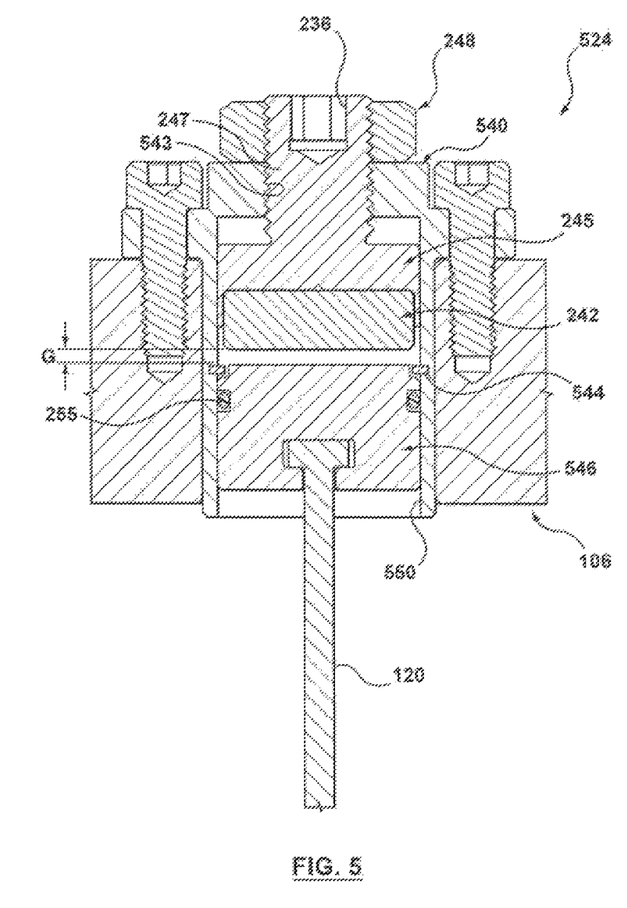
FIGS. 5-7 are sectional views of magnetic valve pin couplings disposed within a portion of a valve pin plate in accordance with various alternate embodiments hereof.

FIG. 5 is a sectional view of magnetic valve pin coupling 524 affixed to valve pin plate 106 in accordance with another embodiment hereof that may be used in the injection molding apparatus 100 of FIG. 1. Features and aspects described with reference to the other embodiments hereof can also be used with the present embodiment. Magnetic valve pin coupling 524 is similar to magnetic valve pin coupling 124 described with reference to FIGS. 1-4 except for main housing 540. Main housing 540 includes a main bore 550 having a substantially constant diameter or width that slidingly receives both magnet holder 245 and valve pin holder 546 and has a threaded opening 543 for threadably coupling with threaded projection 247 of magnet holder 245. Valve pin holder 546 includes slots 539 within an upstream end thereof. Stop pins 544 are fixed to housing 540 to protrude into main bore 550 and sit within a respective slot 539 of valve pin holder 546. In this manner, stop pins 544 perform the function of housing shoulder 244 as described in the embodiment of FIGS. 1-4. More particularly, valve pin holder 246 abuts or sits against stop pins 544 under normal operating conditions in order to maintain gap G between magnet 242 and valve pin holder 246. All other features and functions of the embodiment of FIG. 5 are the same as the embodiment of FIGS. 1-4. In another embodiment, stop pins 544 may be replaced by a retainer ring (not shown) that is sized to be received and positioned within bore 550 to create a shoulder against which valve pin holder 246 abuts under normal operating conditions in order to maintain gap G between magnet 242 and valve pin holder 246.

Figure 6:
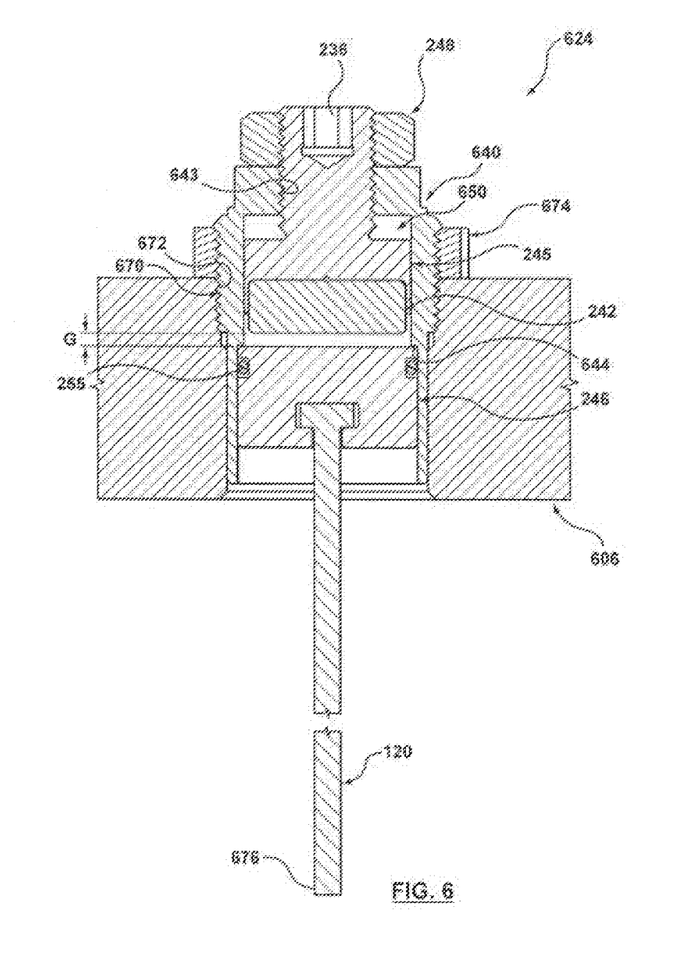

FIG. 6 is a sectional view of magnetic valve pin coupling 624 affixed to valve pin plate 606 in accordance with another embodiment hereof that may be used in the injection molding apparatus 100 of FIG. 1. Features and aspects described with reference to the other embodiments hereof can also be used with the present embodiment. Magnetic valve pin coupling 624 is similar to magnetic valve pin coupling 124 described with reference to FIGS. 1-4 except for main housing 640. Main housing 640 includes a stepped main bore 650, a shoulder 644 and a threaded opening 643 that perform the same functions and receive both magnet holder 245 and valve pin holder 246 in the same manner as previously described with reference to stepped main bore 250, shoulder 244 and threaded opening 243 in the embodiment of FIGS. 1-4. Main housing 640 differs from main housing 240 in the manner in which housing 640 is attached to valve pin plate 606. An external surface of main housing 640 includes a threaded segment 670 that is threadably received within a corresponding threaded bore 672 of valve pin plate 606. The amount of threaded engagement between housing 640 and valve pin plate 606 may be adjusted to adjust a height or distance of a tip portion 676 of valve pin 120 relative to its respective mold gate. A locking nut 674 that is threadably connectable to the portion of housing threaded segment 672 that extends from valve pin plate threaded bore 672 is used to secure a longitudinal position of main housing 640 relative to valve pin plate 606 and thereby a longitudinal position of magnetic valve pin coupling 624 with respect to valve pin plate 606. All other features and functions of the embodiment of FIG. 6 are the same as the embodiment of FIGS. 1-4.

Figure 7:
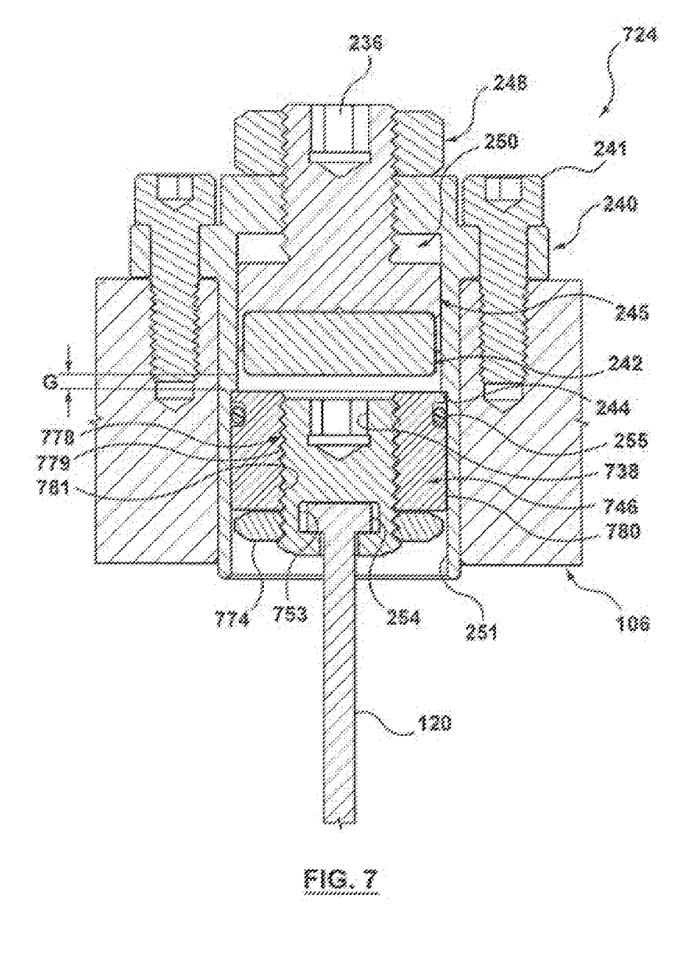

FIG. 7 is a sectional view of magnetic valve pin coupling 724 affixed to valve pin plate 106 in accordance with another embodiment hereof that may be used in the injection molding apparatus 100 of FIG. 1. Features and aspects described with reference to the other embodiments hereof can also be used with the present embodiment. Magnetic valve pin coupling 724 is similar to magnetic valve pin coupling 124 described with reference to FIGS. 1-4 except for valve pin holder 746. Valve pin holder 746 has two concentric parts with inner part 778 threadably fitting within outer part 780. More particularly inner part 778 has an external threaded segment 779 that is threadably received within a corresponding threaded bore 781 of outer part 780. Inner part 778 includes a threaded tool bore 738 for receiving a threaded tool (not shown) that may be used to rotate inner part 778 relative to outer part 780. The amount of threaded engagement between inner part 778 and outer part 780 may be adjusted to adjust a height or distance of a tip portion (not shown) of valve pin 120 relative to its respective mold gate. A locking nut 774 that is threadably connectable to the portion of inner part threaded segment 779 that extends from outer part threaded bore 781 is used to secure a longitudinal position of inner part 778 with respect to outer part 780 of valve pin holder 746. Outer part 780 includes a circumferential groove in which o-ring 255 is seated and is sized to be slidably received within first bore segment 251 of housing 240 and to abut shoulder 244 thereof under normal operating conditions. Inner part 779 includes a slot 753 within which head portion 254 of valve pin 120 is received. All other features and functions of the embodiment of FIG. 7 are the same as the embodiment of FIGS. 1-4.

Figure 8:
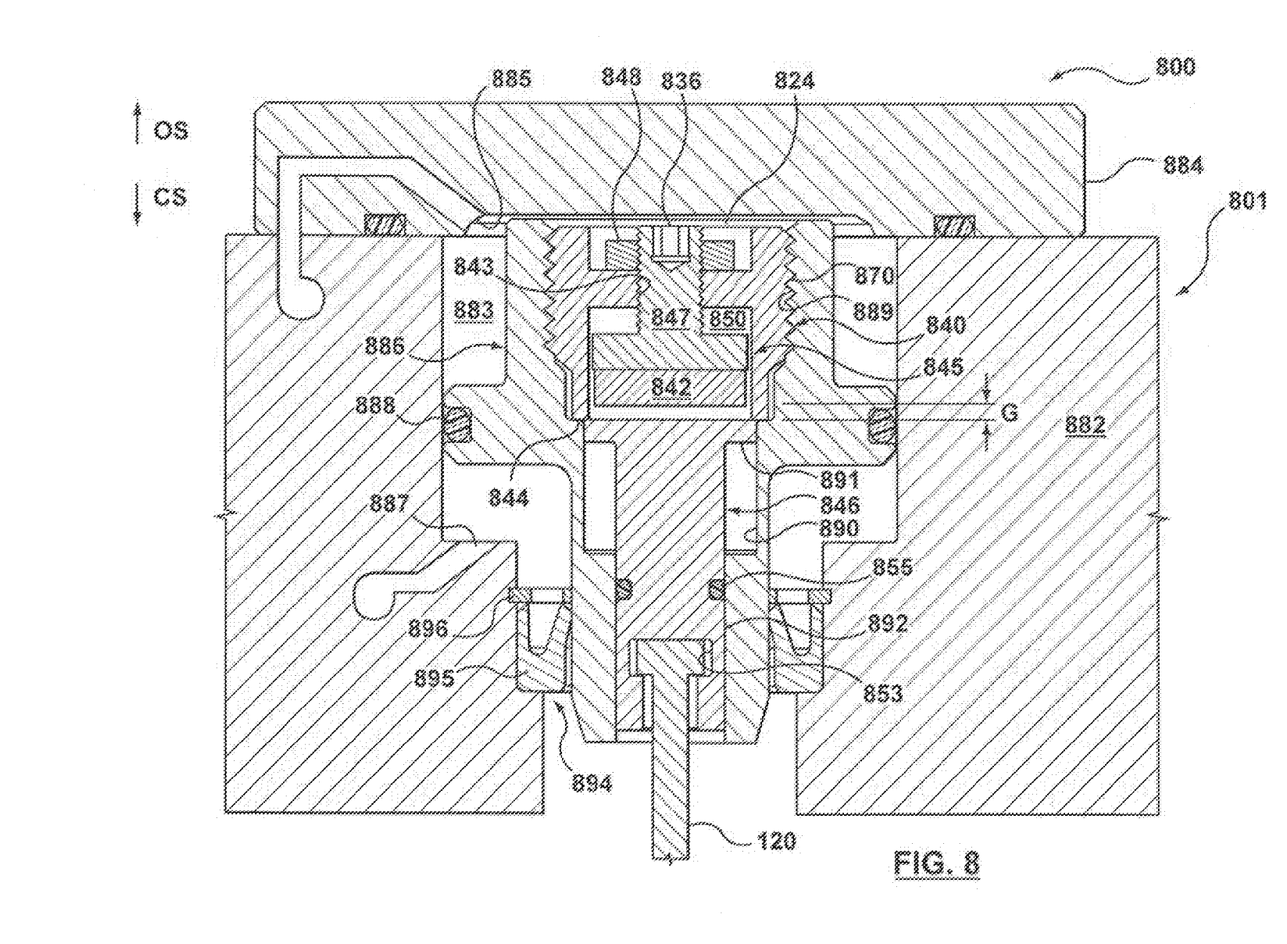
FIG. 8 is a sectional view of a magnetic valve pin coupling disposed within an actuator in accordance with another embodiment hereof.

FIG. 8 is a sectional view of an embodiment of a magnetic valve pin coupling 824 disposed within an actuator 801 of injection molding system 800 in accordance with another embodiment hereof that may be adapted for use in the injection molding apparatus 100 of FIG. 1. Features and aspects of the other embodiments may be used with the present embodiment.

Actuator 801 includes an actuator housing 882 with a cap 884 that together with a seal assembly 894 define an enclosed space 883. In an embodiment, actuator housing 882 is a mold plate of injection molding system 800. Seal assembly 894 includes a seal 895 and a seal retainer structure 896 that is engaged with actuator housing 882 to maintain a fixed longitudinal position of seal assembly 894 relative thereto. A piston 886 resides in the space 883 and is slidable within actuator housing 882 and seal assembly 894 in a manner similar to a conventional piston-cylinder arrangement. Fluid pressure applied through a first port 885 will cause piston 886 to slide within actuator housing 882 in the closing stroke direction CS and thereby correspondingly actuate valve pin 120 in the closing stroke direction CS. Fluid pressure applied through a second port 887 will cause piston 886 to slide within actuator housing 882 in the opening stroke direction OS and thereby correspondingly actuate valve pin 120 in the opening stroke direction OS. Fluid pressure may be hydraulic or pneumatic. Seals, such as O-rings 888, are provided to seal against actuator fluid leakage.

Similar to valve pin plate 106, 606 in the previous embodiments, piston 886 is an actuated part for moving valve pin 120 to open or close a mold gate (not shown). Piston 886 includes a threaded opening 889 for receiving a corresponding threaded segment 870 of housing 840 of magnetic valve pin coupling 824. Magnet holder 845 that holds magnet 842 is slidably disposed within main bore 850 of housing 840 with threaded projection 847 of magnet holder 845 being threadably received within threaded opening 843 of housing 840. Threaded projection 847 includes a threaded tool bore 836 for receiving a threaded tool (not shown) that may be used to rotate magnet holder 845 relative to main housing 840. Valve pin holder 846 that holds a head of valve pin 120 within slot 853 thereof is substantially T-shaped and is slidably disposed within a bore 890 of piston 886 with a flange portion 891 of valve pin holder 846 being sized to slide or ride along a first segment of bore 890 and a narrower body portion 892 of valve pin holder 846 being sized to slide or ride along a narrower second segment of bore 890. A circumferential groove within an exterior surface of body portion 892 holds an O-ring 855 that contacts the second narrower segment of piston bore 890 in which valve pin holder 846 is slidably located and serves to prevent dust or other debris from entering a gap "G" that is maintained between magnet 842 and valve pin holder 846, as described herein.

Flange 891 of valve pin holder 846 abuts or sits against an end surface 844 of housing 840 in order to maintain gap G under normal operating conditions. The threaded connection between threaded opening 843 of main housing 840 and threaded projection 847 of magnet holder 845 allows magnet holder 845 to be longitudinally repositioned relative to both main housing 840 and valve pin holder 846 by clockwise or counterclockwise rotation of magnet holder 845 relative to main housing 840. For instance, a clockwise rotation of magnet holder 845 relative to main housing 840 will open or increase the gap G between magnet 842 and valve pin holder 846 and thereby decrease the magnetic attraction or attractive force of magnet 842 acting on valve pin holder 846. Conversely, a counterclockwise rotation of magnet holder 845 relative to main housing 840 will slightly close or decrease the gap G between magnet 842 and valve pin holder 846 and thereby increase the magnetic attraction or attractive force of magnet 842 acting on valve pin holder 846. Although a clockwise rotation is described to open gap G and counterclockwise rotation is described to close gap G, the reverse could be true without departing from the scope hereof. In either case, the width of gap G is set such that the attractive force or magnetic attraction of magnet 842 acting on valve pin holder 846 is sufficient under normal operating conditions to transfer an opening force of piston 886 to valve pin 120 and is overcome when valve pin 120 encounters a stopping or pulling force over a predetermined attractive force value, as discussed above. Once a longitudinal position of magnet 842 relative to valve pin holder 846 that achieves a desired attractive force is established, locking nut 848 may be threaded onto the portion of magnet holder threaded projection 847 that extends beyond housing 840 and tightened against housing 840 to thereby set the longitudinal position and desired width of gap G.

More particularly, when piston 886 is actuated in the opening stroke direction OS, the pulling force or magnetic attraction between magnet 842 and valve pin holder 846 transfers the rearward opening force of piston 886 to valve pin holder 846 thereby actuating valve pin 120 to unseat from its mold gate (not shown). Conversely, when piston 886 is actuated in the closing stroke direction CS, housing 840 transfers the forward closing force of piston 886 to valve pin 120 through direct contact with valve pin holder 846 via flange 891 thereby actuating valve pin 120 to close or seat within its mold gate (not shown).

In operation, if valve pin 120 encounters a stopping force over the predetermined attractive force value, as discussed elsewhere herein, when piston 886 is actuated in the opening stroke direction OS, the attractive force or magnetic attraction between magnet 842 and valve pin holder 846 is overcome, and valve pin holder 846 decouples from magnet 842 and is slidable within bore 890 of piston 886 to permit piston 886 to continue in the opening stroke direction OS. The decoupling between magnet 842 and valve pin holder 846 allows valve pin 120 to remain stationary as the piston 886 continues in the opening stoke direction OS.

Materials and manufacturing techniques for making the embodiments described herein may be those used in the injection molding industry and related industries. While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An injection molding apparatus, comprising:
an actuated part movable in opening stroke and closing stroke directions;
a magnetic valve pin coupling disposed within the actuated part and having a magnetic component and a valve pin component that are separated by a gap G under normal operating conditions, wherein the magnetic component is longitudinally repositionable relative to the valve pin component to adjust a width of the gap G to thereby adjust strength of an attractive force of the magnetic component acting on the valve pin component; and
a valve pin movable with the valve pin component
wherein when the actuated part moves in the closing stroke direction a closing force is transferred to the valve pin component to thereby seat the valve pin within a mold gate, and
wherein when the actuated part moves in the opening stroke direction an opening force is transferred to the valve pin component by magnetic attraction between the magnetic component and the valve pin component to thereby unseat the valve pin from the mold gate.

2. The injection molding apparatus of claim 1, wherein the magnetic valve pin coupling includes a housing connected to the actuated part and contact between the housing and the valve pin component transfers the closing force of the actuated part to the valve pin component.

3. The injection molding apparatus of claim 2, wherein the magnetic component is threadably coupled to the housing such that clockwise or counterclockwise rotation of the magnetic component relative to the housing adjusts the width of the gap G.

4. The injection molding apparatus of claim 1, wherein the actuated part is one of a valve pin plate and a piston of an actuator.

5. The injection molding apparatus of claim 1, wherein the valve pin component includes a valve pin holder that couples with a head portion of the valve pin.

6. The injection molding apparatus of claim 1, wherein the valve pin component forms an upstream portion of the valve pin to be a unitary structure therewith.

7. An injection molding apparatus, comprising:
an actuated part movable in opening stroke and closing stroke directions;
a magnetic valve pin coupling disposed within the actuated part having a housing component connected to the actuated part and having a magnetic component and a valve pin component disposed within a bore of the housing that are separated by a gap G under normal operating conditions; and
a valve pin movable with the valve pin component,
wherein when the actuated part moves in the closing stroke direction a closing force is transferred to the valve pin component by the housing to thereby seat the valve pin within a mold gate, and
wherein when the actuated part moves in the opening stroke direction an opening force is transferred to the valve pin component by magnetic attraction between the magnetic component and the valve pin component to thereby unseat the valve pin from the mold gate.

8. The injection molding apparatus of claim 7, wherein the magnetic component includes a magnet holder for holding a magnet and the gap G is between a forward face of the magnet and a rearward face of the valve pin component.

9. The injection molding apparatus of claim 8, wherein the magnet holder is longitudinally repositionable within the housing to adjust a width of the gap G.

10. The injection molding apparatus of claim 9, wherein the magnet holder is threadably coupled to the housing such that clockwise or counterclockwise rotation of the magnet holder relative to the housing adjusts the width of the gap G.

11. The injection molding apparatus of claim 7, wherein when the valve pin experiences a stopping force greater than a predetermined threshold as the actuated part is moved in the opening stroke direction, the valve pin component is slidable within the housing bore to prevent the valve pin from continued movement with the actuated part in the opening stroke direction.

12. The injection molding apparatus of claim 7, wherein the housing includes a shoulder defined within the bore thereof and the valve pin component sits against the shoulder under normal operating conditions.

13. The injection molding apparatus of claim 7, wherein the housing includes two or more stop pins that extend within the bore thereof and the valve pin component sits against the two or more stop pins under normal operating conditions.

14. The injection molding apparatus of claim 7, wherein the housing is threadably connected to the actuated part and an amount of threaded engagement therebetween sets a height of a tip of the valve pin relative to the mold gate.

15. The injection molding apparatus of claim 7, wherein the valve pin component includes a threaded inner part that holds the valve pin and an amount of threaded engagement the threaded inner part and the remainder of the valve pin component sets a height of a tip of the valve pin relative to the mold gate.

16. The injection molding apparatus of claim 7, wherein the actuated part is a valve pin plate.

17. The injection molding apparatus of claim 7, wherein the valve pin component includes a valve pin holder that couples with a head portion of the valve pin.

18. The injection molding apparatus of claim 7, wherein the valve pin component forms an upstream portion of the valve pin to be a unitary structure therewith.

19. An injection molding apparatus, comprising:
a piston movable within a housing in opening stroke and closing stroke directions;
a magnetic valve pin coupling disposed within a bore of the piston having a housing component connected to the piston, the magnetic valve pin coupling also having a magnetic component and a valve pin component separated by a gap G under normal operating conditions; and
a valve pin coupled to the valve pin component,
wherein when the piston moves in the closing stroke direction a closing force is transferred to the valve pin component by the housing component of the magnetic valve pin coupling to thereby seat the valve pin within a mold gate, and
wherein when the piston moves in the opening stroke direction an opening force is transferred to the valve pin component by magnetic attraction between the magnetic component and the valve pin component to thereby unseat the valve pin from the mold gate.

20. The injection molding apparatus of claim 19, wherein the magnetic component includes a magnet holder for holding a magnet and the gap G is between a forward face of the magnet and a rearward face of the valve pin component.

21. The injection molding apparatus of claim 20, wherein the magnet holder is longitudinally repositionable within a bore of the housing component of the magnetic valve pin coupling to adjust a width of the gap G.

22. The injection molding apparatus of claim 21, wherein the magnet holder is threadably coupled to the housing component of the magnetic valve pin coupling such that clockwise or counterclockwise rotation of the magnet holder relative to the housing component adjusts the width of the gap G.

23. The injection molding apparatus of claim 19, wherein when the valve pin experiences a stopping force greater than a predetermined threshold as the piston is moved in the opening stroke direction, the valve pin component is slidable within the piston bore to prevent the valve pin from continued movement with the piston.

24. The injection molding apparatus of claim 23, wherein the valve pin component includes a T-shaped valve pin holder that includes a flange portion being sized to slide along a first segment of the piston bore and a narrower body portion being sized to slide along a narrower second segment of the piston bore.

* * * * *

UNITED STATES PATENT AND TRADEMARK OFFICE
CERTIFICATE OF CORRECTION

PATENT NO.       : 8,308,476 B2
APPLICATION NO.  : 13/038347
DATED            : March 1, 2011
INVENTOR(S)      : Payman Tabassi and Denis Babin Page 1 of 1

It is certified that error appears in the above-identified patent and that said Letters Patent is hereby corrected as shown below:

In the Claims:

Claim 15, column 12, line 26, insert -- between -- after "engagement."

Signed and Sealed this
Ninth Day of July, 2013

Teresa Stanek Rea
*Acting Director of the United States Patent and Trademark Office*